United States Patent Office 2,922,729
Patented Jan. 26, 1960

2,922,729

METHOD OF PREPARING LAMINATED PAPERBOARD BY TREATING PAPER WITH AQUEOUS SOLUTION OF A SILICATE AND A SUCROSE MODIFIED UREA-FORMALDEHYDE RESIN

John E. Dereich, Painesville, Ohio, assignor to Diamond Alkali Company, Cleveland, Ohio, a corporation of Delaware No Drawing. Application April 13, 1953
Serial No. 348,555

9 Claims. (Cl. 117—155)

This invention relates to novel compositions of matter comprising aqueous adhesive silicate glass characterized by high adhesiveness to cellulose-containing materials, such as paper surfaces employed in laminated paper articles, which are also characterized by lack of adhesion to heated metal surfaces. The invention relates also to methods of forming laminated paperboard employing the new compositions.

Further characteristics of the new compositions are that they have improved moisture resistance and they do not readily become brittle when subjected to heat and pressure in the laminating equipment. Still another outstanding characteristic is that greater speed of operation of laminating equipment is possible when the novel compositions are utilized as the adhesives for the laminates. A further characteristic is that setting action of these adhesives is prolonged thus permitting them to be compounded well in advance and stored until the date of actual use.

One of the steps of a typical paper laminating operation involves the pressing of the composite sheet after the adhesive has been applied to the plies and such plies have been arranged in laminated relationship. Generally, in the manufacture of corrugated paperboard, this operation is conducted by passing an advancing laminated web of paper over a series of heated platens and pressing the web against the heated platens by means of one or more rollers, whereby the silicate glass is dehydrated and the laminations are united, thus forming a bond between the laminates.

In the manufacture of corrugated paperboard and similar laminates, the silicate glass adhesive may, for example, be applied to the peaks of the corrugations on one side of a corrugated sheet, which sheet is then contacted with a plane-surface facing sheet, and the composite thus formed passed over heated platens, while being subjected to pressure insufficient to destroy the corrugations of the corrugated member but sufficient to effect the bonding of the paper sheets. Thereafter, in accordance with this exemplary method of forming 3-ply laminates, the laminated structure may be coated a second time with an adhesive silicate glass at the peaks of the exposed corrugated surface of the laminate, and the thus-coated structure then formed brought into contact with a second plane-surface and the whole laminate again passed in contact with heated platens, while being subjected to pressure insufficient to destroy the corrugations of the corrugated member but sufficient to effect bonding of the laminate.

Difficulties in the manufacture of such corrugated paperboard arise when aqueous adhesive silicate glass comes into contact with the corrugating and pressure rolls, and the platens of the hot plate driers, forming hard glass-like deposits thereon, thus fouling the rolls and necessitating interrupting production to remove said deposits. Further, as the laminated structure passes between the pressure rollers and the platens of the hot-plate driers, some of the adhesive silicate glass exudes from the portions of the laminate nearest the edges thereof and to be deposited upon the heated surface of the platens. After a relatively short period of time, these deposits of the exuded adhesive silicate material accumulate upon the surface of the platens and build up into ridges or mounds near the region of the edges of the moving laminated web under the influence of the relatively intense heat of the platen surface are dehydrated to a hard, strongly adherent, solid silicate glass. These deposits are then in a position to effect the destruction of the edges of the moving laminated structure passing across the heated platen surface. Moreover, as the production of laminated webs of lesser and greater widths may be scheduled alternately during a given production period, the changeover from the lesser to the greater widths may leave deposits of the dehydrated silicate glass in a position to mar substantial areas longitudinally of the wider webs. When the accumulation of the deposits of dehydrated silicate glass are sufficient to cause the destruction of substantial areas of the wider laminated webs passing thereover, the whole operation must be interrupted and the heated platens cleaned before further production of such wider webs may be started. A major difficulty in the cleaning operation arises from the fact that the dehydrated silicate glass adheres quite strongly to the platens, requiring considerable time and hand labor to dislodge the deposit and refinish the surface.

The present invention is directed to a composition and method for decreasing the adhesion of an adhesive silicate glass composition to heated metal surfaces generally.

Another object of the invention is to provide a method and composition for preventing the adhesion of aqueous adhesive silicate glasses commonly employed in the paper laminating industry to the heated metal surfaces of the platens used to form laminates.

A further problem is sometimes encountered in using silicate adhesives under conditions of abnormally prolonged high humidity. Under high humidity conditions there is a tendency for the usually strong silicate adhesives to take up water and when this occurs, its adhesive power is reduced somewhat. Thus, in preparing silicate adhesives, it is desirable to improve the moisture resistance properties of the silicate itself. Moreover, additives which are combined with the silicate should not decrease moisture resistance and as some additives have been found to have such a negative function, the field from which additives might be selected is, in consequence, limited.

It is, therefore, a further object of this invention to provide an aqueous adhesive silicate composition that is characterized by low adhesiveness to metal surfaces and which also has improved resistance to moisture.

In paper laminating operations, the speed at which the laminating equipment may operate is directly related to the time required to develop a satisfactory adhesive bond between the several laminates. It is desirable that adhesives be employed which do not require an unduly long heat treatment in the equipment, and further, it is desirable to reduce the time required as much as possible. A further object of this invention is to provide novel silicate adhesives which not only have the aforementioned desirable characteristics but which also permit greater speed of operation of laminating equipment.

Another object of the invention is to provide novel silicate adhesive compositions having the aforementioned characteristics and which also may be stored for long periods of time without undergoing the setting action which renders them unusable.

These and other objects will occur to those skilled in the art from the description of the invention set forth below.

I have found that when a suitable quantity of particular resins are combined with aqueous adhesive silicate compositions as hereinafter described, compositions result which are improved in respect to all of the foregoing mentioned characteristics. Resins that have been found to be especially effective are resins composed principally of urea, formaldehyde and sugar; they may be termed sugar-modified urea formaldehyde resins.

A particularly suitable type of sugar-modified urea formaldehyde resin may be made by combining sugar and formaldehyde, the latter suitably being in the form of 40% formalin, but other concentrations of solution being usable, if desired, at an elevated temperature of the order of 100° C., though the temperature is not critical. This combination may be made in ratios varying from 3 parts of sugar to 1 part of formaldehyde, taken as 40% formalin, to 1 part of sugar to 3 parts of formaldehyde, again taken as 40% formalin. Upon heating this combination, urea is added thereto, preferably in small increments, so that the reaction which occurs may be completed before the next increment is added. Varying quantities of urea may be employed, but it has been found that the urea should, in general, be present in the amount of approximately 1 part thereof to 3 parts of formalin, so that the quantity of urea will depend upon the amount of formalin used in the formula as given above. After the reaction is completed, additional sugar may be added, if desired, whereupon the resin is ready for use in the adhesive formula. It has also been found, however, as a variation from the above formula, that the resin in general may be more readily applied to the adhesive formula if the resin is employed in the form of a solution in a glycol, an exemplary glycol being propylene glycol.

A specific example of the manner of preparing the resin described above is set forth below and is designated Resin A.

RESIN A

One hundred and fifty grams of sugar (sucrose) is added to 112 grams of 40% formalin and the solution is heated to 100° C. At this point, 37½ grams of urea are added in 5-gram increments. Heating is continued for about 10 minutes, after which time 25 grams of sugar are added. After complete solution of the sugar, 50 mls. of propylene glycol are added with stirring and the solution is allowed to cool.

The propylene glycol takes no part in the reaction and insofar as its presence in relation to the resin is concerned, it is merely a solvent. However, as an element in the compositions of the invention, it functions as a diluent replacing, in whole or part, water which normally is the diluent employed in silicate adhesives. Furthermore, propylene glycol aids in reducing brittleness of the final adhesive bond and, therefore, is a desirable ingredient. Other glycols generally similar to propylene glycol as, for example, ethylene and butylene glycol, diethylene, dipropylene and dibutylene glycols function equivalently and, therefore, may be substituted at will within the purview of the invention. Resin A, moreover, wherever used in the specification and claims, is intended to include propylene glycol and to extend to equivalents thereof.

In some instances, especially where economic considerations are important in the silicate adhesive formula, the use of resins of the type of Resin A described above has been found to be limited in application. This is especially true since the desirability of employing a relatively substantial quantity of glycol, while contributing strongly to the advantageous characteristics of the formula, nevertheless is accompanied by increase in cost. Accordingly, it has been found that the glycol formulation may be modified and the glycol itself dispensed with for certain applications of the present invention by employing in the formulation of the sugar-modified urea formaldehyde resin a suitable catalyst, an example of which is hexamethylenetetramine. In preparing this modified resin, the same relation of materials, i.e., sugar (sucrose), formaldehyde (in the form of formalin), and urea, may be employed as in that described for the resin exemplified by Resin A above, except that in the initial mixture of sugar and formalin, the solution is suitably heated with hexamethylenetetramine to advance the reaction between the two materials. Thereupon, a quantity of urea is added which bears the same relation to the formalin employed as in the resin discussed above. This species of the invention has the additional advantage, however, that further sugar need not be added to the formula but upon the addition of the urea to the catalyzed reaction mass of sugar and formalin, the material is ready for addition to an adhesive formula. A specific example of this type of resin, designated Resin B, is as follows:

RESIN B

One hundred and fifty grams of sucrose are dissolved in one hundred and twelve grams of 40% formalin. The solution is heated to the boiling point, and five grams of hexamethylenetetramine are added as a catalyst. Next, while the solution is still boiling, thirty-seven and one-half grams of urea are slowly added, heating being continued, with stirring until a clear solution is obtained. The solution is allowed to cool.

The compositions of the invention include the aqueous silicate glass solution, the silicate being the basic adhesive, suitable quantities of urea, which may be ordinary technical grade, alkali metal chromate or bichromate, suitably sodium bichromate, suitable quantities of the foregoing or similar or equivalent resins and water. The compositions may include also suitable quantities of a glycol, for example, propylene glycol, either as a separate additive or combined with the resinous material. To increase covering power of the compositions, they may include additionally a finely divided clay of sufficient fineness, i.e., of the order of the average particle size of a few microns diameter, and of which Barden clay is exemplary and satisfactory. No criticality lies in the manner of combining these ingredients. The resinous materials are readily soluble in the silicate, and the subordinate ingredients may be expeditiously added to the silicate solution after dissolution in hot water, the addition being accompanied by vigorous agitation. If desired, clay may be admixed last. Instead of adding the resin dispersed in glycol, they may each be added separately, and, as indicated previously, various equivalents of propylene glycol may be employed as a diluent and brittleness-reduction ingredient.

The method of the invention may suitably be carried out by employing a composition prepared as described above in a known type of boxboard or other laminated paper manufacturing machine and in a manner entirely equivalent to that used for ordinary untreated silicate adhesive.

While the relative proportions of the materials in the composition of the invention are not highly critical, it has been found that suitable materials, in the sense of high adhesiveness to boxboard structures and low adhesiveness to heated surfaces of boxboard machines, the latter being sufficiently low so that a moving web of paper dislodges deposits without damage to the paper, and in the further sense of high exemplification of the other important characteristics heretofore mentioned, comprise in parts by weight between 4–10 parts resin, either including or not including from 0.5–2 parts glycol, .5–6 parts urea, up to 1 part sodium bichromate, up to 10 parts water, and the balance aqueous silicate glass solution to 100 parts, the silicate solution containing 35–45% solids and averaging on the weight bases 1 part of $Na_2O$ to between 2.5 and 4 parts of $SiO_2$, and suitably within the range of $1Na_2O$ to 3–3.5$SiO_2$, preferably about $1Na_2O$ to 3.3 parts of $SiO_2$, and which may suitably contain a small amount of an anionic wetting agent, of which aromatic monosodium sulfonate derived from petroleum oil, alkyl aryl sulfonates, coconut oil sulfonates, and the like are examples, an exemplary quantity being about 1%.

In order that those skilled in the art may have a clearer understanding of the invention and its preferred mode of practice, the following specific examples are offered:

*Example I*

A composition is formulated as follows:

| | Percent |
|---|---|
| Sodium silicate solution containing 1% alkyl aryl sulfonate wetting agent, (40.8° Bé.) 38.3% solids ($Na_2O:SiO_2$ ratio, 1:3.3) | 85.3 |
| Urea | 5.5 |
| Sodium bichromate | 0.2 |
| Water | 2.0 |
| Resin A | 7.0 |

As indicated previously, Resin A includes a glycol solvent; therefore, this composition includes about 1 part by weight of propylene glycol.

*Example II*

This composition is identical with Example I, except that Resin A is substituted by 4 parts of Resin B and water is increased to 5 parts.

*Example III*

The composition of Example II is modified to include 1 part by weight of propylene glycol and 4 parts by weight of water, other ingredients remaining as in Example II.

Still other compositions exemplary of the invention are those identical with the foregoing except that the wetting agent is omitted from the silicate solution, the parts by weight of silicate solution remaining the same however.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of preparing laminated paperboard, which includes the step of applying to at least one of a plurality of paper webs, as the adhesive therefor, a composition comprising, in major proportion, aqueous silicate glass solution having solids content of 35–45% and a $Na_2O:SiO_2$ ratio of 1:2.5–4, and, in minor proportion, a sucrose-modified urea formaldehyde resin.

2. The method as claimed in claim 1 wherein the said resin comprises between about 4–10% by weight of the composition and there is also included a small quantity of urea.

3. The method as claimed in claim 2 wherein the said composition includes a small quantity of a glycol.

4. The method of preparing laminated paperboard, which includes the step of applying to at least one of a plurality of paper webs, as the adhesive therefor, a material having the following composition:

| | Percent |
|---|---|
| Aqueous silicate glass solution ($Na_2O:SiO_2$ ratio, 1:2.5–4) 35–45% solids | 73–91 |
| Urea | 5–6 |
| Sodium bichromate | Up to 1 |
| Sucrose-modified urea formaldehyde resin | 4–10 |
| Water | Up to 10 |

5. The method as claimed in claim 4 wherein there is included a small quantity of an anionic wetting agent of the class of organic sulfonates.

6. The method of preparing laminated paperboard, which includes the step of applying to at least one of a plurality of paper webs, as the adhesive therefor, a material having the following composition:

| | Percent |
|---|---|
| Aqueous silicate glass solution ($Na_2O:SiO_2$ ratio, 1:2.5–4) 35–45% solids | 85.3 |
| Urea | 5.5 |
| Sodium bichromate | 0.2 |
| Sucrose-modified urea formaldehyde resin dissolved in a glycol | 7.0 |
| Water | 2.0 |

7. The method as claimed in claim 6 wherein there is included a small quantity of an anionic wetting agent of the class of organic sulfonates.

8. The method of preparing paperboard, which includes employing as the adhesive therefor, a material having the following composition:

| | Percent |
|---|---|
| Aqueous silicate glass solution ($Na_2O:SiO_2$ ratio, 1:2.5–4) 35–45% solids | 85.3 |
| Urea | 5.5 |
| Sodium bichromate | 0.2 |
| Resin B | 4.0 |
| Water | 5.0 |

9. The method as claimed in claim 8 wherein there is included a small quantity of an anionic wetting agent of the class of organic sulfonates.

References Cited in the file of this patent

UNITED STATES PATENTS

| 2,150,147 | Bowen et al. | Mar. 14, 1939 |
| 2,463,148 | Caesar et al. | Mar. 1, 1949 |
| 2,465,094 | Hartwig | Mar. 22, 1949 |
| 2,517,261 | Veitch | Aug. 1, 1950 |
| 2,674,584 | Deniston | Apr. 6, 1954 |

FOREIGN PATENTS

| 386,328 | Great Britain | Jan. 2, 1933 |